April 18, 1933. L. N. DUNCAN 1,904,292
SPRINKLING DEVICE
Filed Sept. 8, 1931

INVENTOR
Lee Norman Duncan

Patented Apr. 18, 1933

1,904,292

UNITED STATES PATENT OFFICE

LEE NORMAN DUNCAN, OF OKLAHOMA CITY, OKLAHOMA

SPRINKLING DEVICE

Application filed September 8, 1931. Serial No. 561,663.

My invention relates to improvements in sprinkling device for uniformly and evenly distributing liquid over a predetermined rectangular area.

The principal objects of my invention are to provide a device of this character which is new, novel, practical, useful, and of evident utility; which is strong, positive in action, durable and reliable; which consists of but few sturdy parts, is easily operated, cannot easily get out of order and is efficient for the purposes for which it is intended; to provide a portable sprinkling device for use in watering lawns, flower and vegetable gardens whereby the whole area being watered receives a uniform amount of water; to provide a device which may also be made a permanent fixture in green houses, flower and vegetable gardens; to provide a device having a plurality of nozzles for directing streams of water, tangentially in varying degrees, against the periphery of eccentrically rotating, corrugated cylinders or rollers; to provide housings and shields for said rollers adapted for seating upon a water supply pipe and having set screw means for positioning and holding said shield on said pipe; to provide supporting means for holding said supply pipe in proper spaced relationship to the surface or area being watered; to provide clamping means on said supports whereby said supply pipe may be tilted to regulate the distance from said pipe the spray will cover; to provide hose connection and valve means for controlling the supply of water to the sprinkling device.

Figure 1:
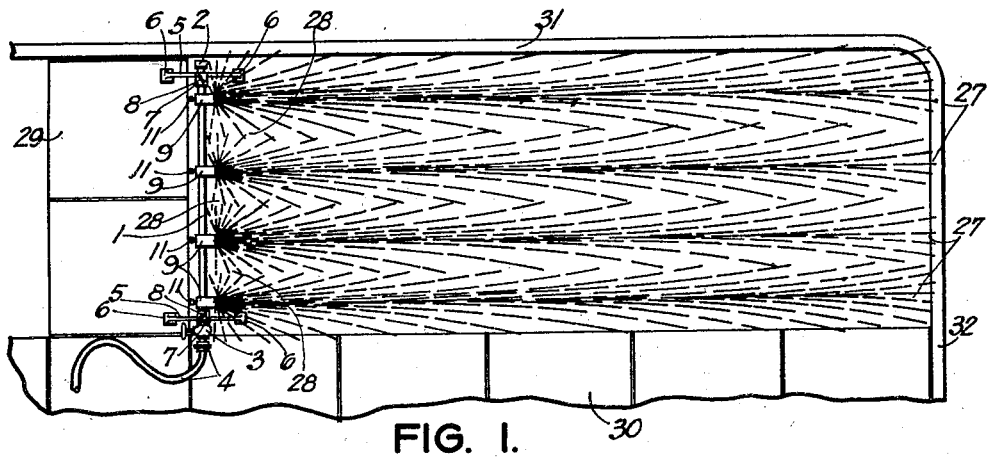
Figure 2:
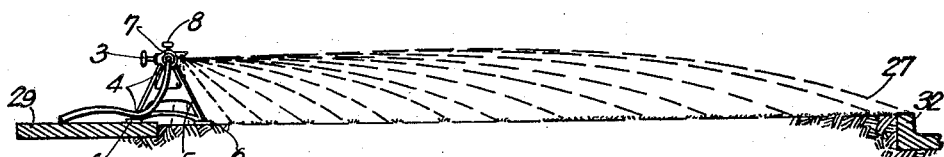
Figure 3:
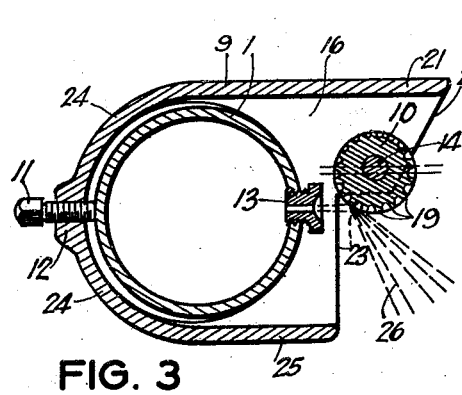
Figure 4:
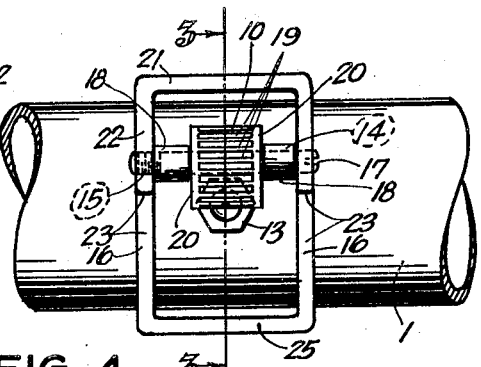
Figure 5:
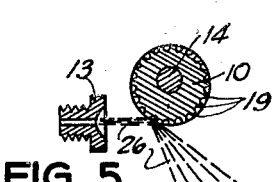

With these and other objects in view as will more fully appear, my invention consists in the construction, novel features, and combination of parts hereinafter more fully described, pointed out in the claims hereto appended, and illustrated in the accompanying one-sheet drawing, of which, Figure 1 is a plan of the device in operation; Fig. 2 is an elevational view of Fig. 1; Fig. 3 is a sectional side elevation of the supply pipe, housing and shield, nozzle and roller on the line 3—3 of Fig. 4; Fig. 4 is a front elevation of Fig. 3, and Figs. 5, 6 and 7 are diagrammatic views of the roller in different positions.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof, and it is further understood that the drawing is to be interpreted as being illustrative and not restrictive.

The preferred embodiment of my invention is shown as follows:

The numeral 1 represents the water supply pipe, having cap 2 for closing the end thereof. Valve 3 and hose and connection 4 for said pipe 1 provide the water supply and control for the device. The pipe 1 and its attachments is supported by the triangular frames 5 resting on feet 6, the frames 5 terminate in collars 7 in which the said pipe 1 is seated. Collars 7 are provided with clamp screws 8 for holding pipe 1 in any desired position. Eccentric roller 10 is seated in shield and housing 9, said housing being adjustably secured to pipe 1 by set screw 11 passing through threaded boss 12 and bearing against said pipe 1. Nozzle 13 is in threaded connection through the wall of pipe 1. Axle 14 for roller 10 is threaded at 15 into the side wall 16 of shield and housing 9, said axle 14 having screw driver slot means 17 for seating the axle in fixed position. Eccentric roller 10 rotates on said fixed axle 14 and is properly positioned between side walls 16 by spacer sleeves 18 on said axle 14. I provide properly shaped corrugations or indentations 19 simulating gear teeth on the surface or roller 10, said corrugations do not extend the full length of the roller, a smooth cylindrical space 20 being left at both ends of said roller 10 to form a stop for said corrugations to prevent excessive lateral deflection of the water. A shield or hood is formed over roller 10 by the forward extending top wall 21 and the backward sloping edges 22 of side walls 16, the said edges 22 changing to a right angled contour 23 immediately below the roller 10. The shield and housing 9 is provided with the cylindrical pipe encircling back wall 24 terminating in a bottom cross wall at 25.

Figure 6:
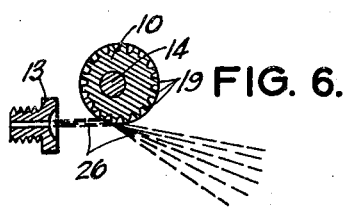
Figure 7:
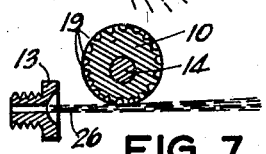

In operating my sprinkling device, shield and housing 9 is seated on pipe 1 by means of set-screw 11 in such position that the stream of water 26 from nozzle 13 will be directed tangentially under the eccentric roller 10 when in the position indicated in Fig. 7. Since said roller 10 is free to rotate upon axle 14 the said roller will start spinning rapidly as soon as valve 3 is opened. Due to the eccentricity of roller 10, which must closely approximate one-half the diameter of water jet 26 the said jet, striking the wabbling roller as it spins, is directed downward along its path as diagrammatically indicated in Figs. 3, 5, 6 and 7. The roller as positioned in Fig. 7 causes very little deflection in the flow of water, the drops are large and unbroken and are carried out to the farthest limit 27 of the spray. The roller as shown in the position of Fig. 6 deflects the jet downward and breaks up the stream of water into somewhat smaller particles which will not carry so far and are deposited a little short of limit 27. This process continues until the roller 10 is in a position to offer the maximum amount of deflection to the jet of water issuing from nozzle 13, and the water is deposited directly below and in front of the roller. Under ordinary city water pressure the roller spins at high speed so that the action just described takes place rapidly and the water is evenly distributed along and on both sides of a path from immediately under the nozzle to the farthest limit of the spray.

As shown in Fig. 1, I provide a plurality of nozzle and roller units along the supply pipe spaced so as to distribute the water over any desired area within the limits of water supply and pressure. This application and disclosure is based upon working models evolved after numerous experiments in reducing the device to practice. I have found that by making roller 10 of a length as shown in Fig. 4, with corrugations 19 terminating near the ends of said roller so as to form smooth cylindrical stops 20 thereon and with the right angle contour 23 in the side walls 16, that the spray will be directed laterally a short distance on both sides of the roller, at first approximately parallel with the supply pipe as at 28, changing to parallelism with the main jet stream outwardly so as to cover the space between said streams as the water spray nears the limit 27 of its travel, the resistance of the air assists in the uniform distribution thereof. Under fairly ideal conditions as to air currents, I have used a long, narrow, shallow drip pan and by actual test I have found that my improved sprinkling device will deliver approximately an equal and uniform amount of water during an equal period of time in any position over the area between points 27 and 28. The maximum distance between points 27 and 28 will of course depend upon the water pressure but the area to be sprinkled can be regulated by tilting pipe 1 and clamping said pipe in the desired position by clamp screws 8. As illustrated in Figs. 1 and 2 my device is placed along cross walk 29 and will thoroughly sprinkle and saturate the area between side walk 30, side curb 31 and cross curb 32. No water is wasted on the walks or pavement and no part of the area receives an excess or deficiency of water. When larger areas are to be sprinkled the device can be moved successively to new positions or more units can be added on a longer supply pipe.

The lawn and garden sprinklers now in use are in general in the form of a ring or some revolving device which sprinkles a circular area. In using these to sprinkle a rectangular surface, the shape of most lawns and gardens, in order to reach a square corner a large amount of the water is wasted on walks, drives and pavements or if waste is to be avoided, patches in these square corners never receive any water and vegetation therein withers and dies. When these ring or revolving sprinklers are moved to a new position in order not to miss any part of the area being sprinkled it is necessary to overlap the surfaces being springled and thus some parts receive an excess of water. This method of sprinkling is analogous to covering a rectangular surface with silver coins. It is impossible without either overlapping the coins or leaving some of the surface uncovered. It can readily be understood from the description of my device that the foregoing deficiencies are all obviated. The only parts of the device subject to wear are roller 10 and axle 14 and these can easily be replaced by means of a screw driver.

While the drawing and this specification has been directed to the use of a roller having corrugations I reserve the right to use a smooth roller or a roller whose circumferential area may have varied deformations other than the exact corrugations as illustrated.

Having thus described my invention, what I claim as new and desire to secure by Letters Patent is:

1. In a sprinkling device the combination of, a shield and housing for a roller, a rotating eccentric roller journaled in said housing having corrugations terminating just short of the ends of said roller for limiting the lateral spread of the spray from a water jet, renewable axle and sleeve means for holding and positioning said roller within said housing, supply pipe and nozzle means for discharging water upon said roller, a set screw on said shield for alining said roller and said nozzle whereby a jet of water from said nozzle is deflected in successive waves uniformly over a desired area by said eccentric roller.

2. In a sprinkling device the combination of, a shield and housing for a roller, a cylindrical, rotating, eccentric roller journaled in said housing, renewable axle and sleeve means for holding and positioning said roller within said housing, supply pipe and nozzle means for discharging water upon said roller, a set screw on said shield for alining said roller and said nozzle whereby a jet of water from said nozzle is deflected in successive waves uniformly over a desired area by said eccentric roller.

3. In a sprinkler unit, the combination of a supply pipe and water nozzle, a shield and a housing seated on said supply pipe over said nozzle, a rotating, corrugated, eccentric roller secured in said housing in the path of the jet from said nozzle, said roller having an essentricity approximating one-half the diameter of said nozzle, cylindrical stops on the ends of said roller for limiting the lateral spread of the spray from said nozzle, said roller being adapted to deflect a stream of water in successive waves uniformly over a rectangular area.

4. In a sprinkling device comprising a supply pipe provided with discharge nozzles, sprinkler unit shield and roller housings seated on said pipe over said nozzles, a rotating, eccentric roller journaled in said housing and having corrugations terminating just short of the ends of said roller for preventing the lateral deflection of the water issuing from the nozzle, adjustable means on said shield for properly positioning said roller in the path of the water from said nozzle whereby the said water is deflected by the said eccentric roller in successive waves uniformly over a desired area.

In testimony whereof I have hereunto affixed my signature.

LEE NORMAN DUNCAN.